United States Patent Office 3,249,384
Patented May 3, 1966

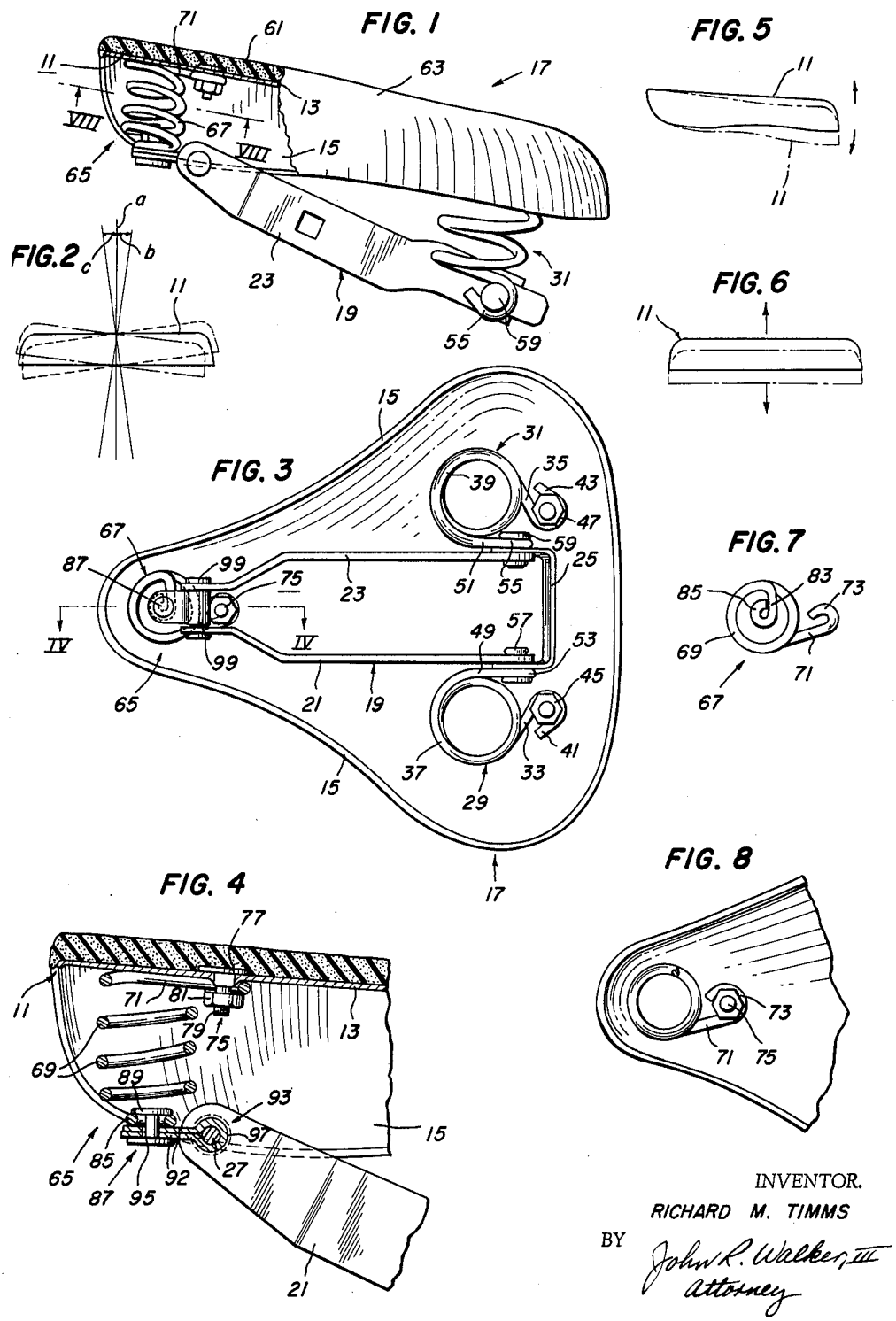

3,249,384
SPRING SUPPORTED SADDLE
Richard M. Timms, Memphis, Tenn., assignor to Troxel Manufacturing Company, Moscow, Tenn., a corporation of Ohio
Filed July 27, 1964, Ser. No. 385,208
8 Claims. (Cl. 297—195)

This invention relates to a spring supported saddle of the type adapted for use on bicycles and the like. More particularly, it relates to a unique and novel means of suspension of the frame of the saddle.

Heretofore, there have been problems in the saddle industry relating to the suspension of the frame of the saddle, which caused uncomfortableness to the rider, particularly when going over bumps and when pedaling the cycle. The usual type of saddle is provided with a pair of conventional coil springs under the rearward portion of the frame, and the frame is pivotally connected adjacent the forward part thereof to its mounting or suspension. This type of mounting provides for up and down pivoting movement of the rearward portion of the saddle about a transverse axis adjacent the forward portion thereof, but there is no side-to-side pivoting of the saddle about a longitudinal axis extending fore and aft of the saddle in the direction of travel of the cycle, and there is no straight up and down movement of the entire saddle, as opposed to a pivoting movement. The problem relative to support of frames of saddles will be appreciated when it is considered that if the frame were entirely supported by conventional coil springs, as, for example, two adjacent the rear part of the saddle and one in the front, the saddle would not be practical, since the saddle would be unstable and would not properly support the rider as he leans to the side, with a possibility of the rider falling off. Therefore, the usual type of saddle is prevented from side-to-side tilting by the front mounting, and some saddles are fixedly attached to the cycle frame without any springs, which gives an extremely uncomfortable ride.

The present invention is directed towards overcoming the heretofore mentioned and other problems of saddle suspension by providing a unique suspension which supports the frame for side-to-side pivoting movement, straight up and down movement, pivoting movement about a tranverse axis, and combinations of these movements for a completely comfortable ride, yet the saddle is stable, and there is no likelihood of excessive movement that would cause the rider to fall off. This unique suspension of the present invention, in general, is accomplished by providing a three-spring support which, among other things, utilizes for the front spring a torsion arrangement in combination with a coiled spring.

Thus, one of the objects of the present invention is to provide a spring supported saddle which permits just enough movement to give a floating effect, yet is completely stable.

A further object is to provide such a saddle which permits substantially universal movement and, more particularly, any one or combination of the following movements: (1) side-to-side pivoting movement; (2) pivoting movement about a transverse axis; and (3) straight upward and downward movement.

A further object is to provide such a saddle which permits a comfortable degree of give or rolling of the saddle with the rider's movement during pedaling of the cycle.

A further object is to provide such a saddle which includes a unique arrangement of the suspension at the front of the saddle that includes a combination compression spring and torsion spring, with the spring being arranged in such a manner that the torsion portion of the spring is twisted as the saddle is urged from side to side to permit the correct amount of motion for comfort and safety, as, for example, a maximum of about 10 degrees.

A further object is to provide such a unique arrangement of the suspension at the front of the saddle that includes a provision for both hinged and upward and downward spring action in addition to the torsional action heretofore mentioned.

A further object is to provide such a unique front end suspension arrangement which compensates for the usually stronger right leg of the rider.

A further object is generally to improve the construction of cycle saddles and to increase the comfort of the rider.

The means by which the foregoing and other objects of the present invention are accomplished and the manner of their accomplishment will be readily understood from the following specification upon reference to the accompanying drawings, in which:

FIG. 1 is a side elevational view of the saddle of the present invention, with portions being broken away and removed for purposes of illustration.

FIG. 2 is a diagrammatic view, as viewed from the rear of the saddle, illustrating the side-to-side movement of the saddle.

FIG. 3 is a bottom view of the device of FIG. 1.

FIG. 4 is an enlarged fragmentary sectional view taken as on the line IV—IV of FIG. 3.

FIG. 5 is a diagrammatic view, as viewed from the side of the saddle, showing another movement of the saddle, that is, the pivoting movement of the saddle about a transverse axis.

FIG. 6 is a diagrammatic view, as viewed from the rear of the saddle, illustrating still another movement of the saddle, that is, the up and down movement.

FIG. 7 is a bottom view of the front spring of the saddle.

FIG. 8 is a fragmentary sectional view taken as on the line VIII—VIII of FIG. 1.

Referring now to the drawings in which the various parts are indicated by numerals, the suspension means of the present invention is illustrated in conjunction with a saddle frame 11 having a pear shape, as shown in the drawings, but it will be understood that other shapes and types of frames can be used in conjunction with the suspension means of the present invention without departing from the spirit and scope of this invention. Thus, for purposes of illustration, the base or saddle frame 11 is shown as formed of a single piece of sheet metal by cutting and stamping operations, and includes a body portion or crown 13 and a depending skirt 15. The overall saddle in which the present invention is incorporated is designated in general as at 17 and comprises, in addition to saddle frame 11, a suitable framework or truss 19 that includes side members 21, 23 rigidly interconnected adjacent the rearward ends thereof by a transverse member 25 and rigidly interconnected adjacent the forward ends thereof by a transverse pin 27. It will be understood that truss 19 is fixedly supported in the usual manner from the frame of the cycle, by suitable well-known means, as a post or the like, not shown, connected to truss 19 and the frame of the cycle. A pair of helical or coiled compression springs 29, 31 are interconnected between truss 19 and frame 11, adjacent the rearward portions of the truss and frame, so that the rearward portion of frame 11 is spring supported by the springs 29, 31. The upper ends of springs 29, 31 are formed as best seen in FIG. 3, wherein it will be seen that the upper ends of the springs are respectively provided with straight portions 33, 35 that are respectively integrally formed with and extend substantially tangentially away from the uppermost of the helical turns 37, 39 of the springs. Portions 33, 35 are preferably substantially flat against the bottom of saddle frame 11 and converge rearwardly and inwardly towards each other, as shown in FIG. 3. The distal ends of portions 33, 35 are doubled back upon themselves to establish the horizontally extending U-shaped portions 41, 43 which respectively receive the fastening members 45, 47 that extend through apertures in crown 13 to fasten the upper ends of the springs 29, 31 to the saddle frame 11. The lower ends of the springs 29, 31 are respectively provided with additional straight portions 49, 51 that extend rearwardly from the lowermost of turns 37, 39 and along the side members 21, 23. The distal ends of straight portions 49, 51 are doubled back under themselves to establish the vertically extending U-shaped portions 53, 55, which respectively receive fastening members 57, 59 that extend through apertures in truss 19 and fixedly attach the lower ends of the springs 29, 31 to the truss.

Saddle 17 preferably, though not necessarily, includes a pad 61 on top of crown 13 and a cover 63 over the pad and frame 11.

One of the important features of the present invention resides in the front suspension assembly 65 that includes a combination compression and torsion spring 67 and its related parts. For purposes of clarity, the right and left-hand sides of the spring 67 will be considered from the viewpoint of the rider, that is, the left side will be the portion towards the upper part of the drawings in FIGS. 3, 7 and 8, and the right side will be the portion towards the bottom of the drawings. Spring 67 is arranged with its axis extending vertically, and with the helical turns 69 of the spring extending around the vertical axis in spaced relationship thereto. Preferably from the right side of spring 67, a straight torsional portion 71 of the spring leads substantially horizontally and rearwardly. When installed in saddle 17, the torsional portion 71 of spring 67 lies substantially flat against the underside of crown 13, as best seen in FIGS. 1 and 4, with the torsional portion being aligned substantially fore and aft relative to saddle 17 and the direction of movement of the cycle, not shown. Although torsional portion 71 can be described as being substantially fore and aft and as extending substantially rearwardly, it is preferably slightly angled inwardly towards the center line of saddle 17, as best seen in FIG. 8. The rearward or distal end of torsional portion 71 is turned back upon itself to provide the substantially U-shaped portion 73 which receives the fastening member 75 that extends through an aperture in crown 13, as best seen in FIG. 4. Fastening member 75 is of any suitable construction and preferably includes the circular head 77 on the upper side of crown 13 and the threaded portion 79 depending axially downwardly from the head 77 with a nut 81 threadedly engaged thereon below the U-shaped portion 73 to anchor the torsional portion 71 securely to the frame 11. The lower end of spring 67 extends radially inwardly towards the center axis of the spring, as best seen in FIG. 7, for a portion as at 83 which at the distal end is formed to establish a substantially circular portion 85 preferably centered over the center portion or axis of the spring 67 to receive a fastening member 87. Portion 83 preferably leads radially inwardly from the lowermost of turns 69 from a place which is on the left side of the spring, so that the lead-in places of the torsional portion 71 and portion 83 are on the opposite sides of the spring and counterbalance each other. Also, by having this arrangement, from the front of the saddle complete turns 69 are seen, which adds to the appearance of the saddle. In addition, it should be noted that the spring 67 is a left-hand wound spring, and this, coupled with the fact that the torsional portion 71 is on the right-hand side of the rider, compensates for the usually stronger right leg of the rider.

The connection between circular portion 85 and the front end of truss 19 is preferably as follows: A fastening member, which preferably is in the form of a rivet 87 having an enlarged portion 89 on the upper end thereof above circular portion 85, extends downwardly through aligned apertures in the adjacent leg portions 92 of a clip 93 and is provided with an enlarged portion 95 on the lower end thereof. Clip 93 is preferably formed of a piece of metal which is folded back upon itself to establish the legs 92 and which has its intermediate portion in the form of a barrel 97 integrally formed with legs 92 and turnably surrounding transverse pin 27 to provide a pivotal connection between truss 19 and the lower end of spring 67, so that the saddle frame 11 can pivot about a transverse axis coincident with the axis of transverse pin 27 to permit the rearward end of frame 11 to pivot upwardly and downwardly, as best seen in FIG. 5. The opposite ends of transverse pin 27 are preferably enlarged as at 99 to retain the pin in place.

In riding on saddle 17, in addition to the movements heretofore described and as shown in FIG. 5, it will be understood that the frame 11 can also move straight up and down, as shown in FIG. 6, since the frame is supported by the three springs 29, 31 and 67. Also, in addition to the heretofore described two movements, one of the main functional movements, which is shown in FIG. 2, is made possible by the arrangement and construction of torsion spring 67. This operation and function is described as follows: When the weight of the rider is shifted to one side of saddle 17, as, for example, when the rider is pedaling the cycle and pushing downwardly with his right leg, the saddle will be urged from the solid line position shown in FIG. 2 towards a tilted position to the right relative to truss 19 and the cycle, as shown in broken lines in this figure. In other words, assuming that to begin with the cycle is in a vertical position and the frame 11 is in horizontal position, the frame will incline to the right or at an angle relative to the vertical. In FIG. 2, the vertical is shown as at line "a," and the angle of tilt is shown as at "b." Then, when the rider pushes down with his left leg, the saddle frame 11 will tilt to the left past a horizontal position to the position shown in dotted lines by the angle of tilt "c." However, the saddle frame 11 will be limited in its tilting movement for the hereinafter described reasons. When the frame 11 is tilted, portion 71 provides a torsional effect, that is, in going from a horizontal position to the position shown in broken lines in FIG. 2, the torsional portion 71 is twisted clockwise about its longitudinal axis, which extends substantially fore and aft, and when tilted in the opposite direction, the torsonal portion is twisted in the opposite direction. It will be understood that the resistance to twisting of the torsional portion 71 will be relatively light during the first part of the movement, so that the saddle frame 11 will closely follow the movements of the rider, but when it approaches positions such as those shown in FIG. 2, the resistance to twist becomes increasingly greater so that the saddle frame is limited in its tilting movement. Also, with torsional portion 71 and portion 83 being on opposite sides of the spring 67 and on the respective stronger sides of the spring as it is compressed under tilting action, they counterbalance each other and limit the amount of tilt. In addition, the arrangement of springs 29, 31 limits the amount of tilt.

From the foregoing description, it will be understood that a very effective and comfortable saddle is provided which permits substantially universal floating movement, with any of the movements illustrated in FIGS. 2, 5 and 6 being possible, either singly or in any combination. In addition, it will be understood that a saddle having suspension means in accordance with the present invention provides a saddle which is a significant advancement in the cycle saddle industry and eliminates many of the problems that heretofore existed in cycle saddles.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A cycle saddle comprising a truss, a frame, and means interconnected between said frame and said truss for supporting said frame from said truss for limited side-to-side pivoting movement of said frame relative to said truss about an axis extending substantially fore and aft relative to said saddle and for upward and downward movement of said frame relative to said truss, said means including a single spring disposed medially of said saddle having a plurality of coiled turns and having its axis arranged substantially vertical, said spring including a substantially straight torsional portion integrally formed with and leading substantially rearwardly from one of said turns on one side of said spring about which said saddle is adapted to twist.

2. A cycle saddle comprising a truss, a frame, and means interconnected between said frame and said truss for supporting said frame from said truss for limited side-to-side pivoting movement of said frame relative to said truss about an axis extending substantially fore and aft relative to said saddle, said means including a single coiled compression spring disposed medially of said saddle having a straight torsional portion extending substantially fore and aft relative to said saddle for twisting when said frame is pivoted to provide a torsional effect.

3. In a cycle saddle having rear and front ends and including a truss and a frame, means for suspending said frame from said truss comprising a front suspension assembly interposed between said frame and said truss adjacent the front end of said saddle, and spring means interposed between said frame and said truss adjacent the rearward end of said saddle, said suspension assembly including a single spring having a plurality of coiled turns and having its axis arranged substantially vertical, said spring including a substantially straight torsional portion integrally formed with and leading substantially rearwardly from one of said turns on one side of said spring, fastening means fixedly attaching said torsional portion to said frame, said spring including a substantially straight lower portion integrally formed with said spring on the opposite side of said spring from said torsional portion, and means connecting said lower portion to said truss adjacent the front end of said saddle.

4. The cycle saddle of claim 3 in which said spring means interposed between said frame and said truss comprises a pair of vertically arranged helical springs having a plurality of helical turns, said pair of springs respectively being provided with substantially straight portions integrally formed with and extending substantially tangentially away from the uppermost of the helical turns of said pair of springs, said substantially straight portions of said pair of springs extending adjacent the underside of said frame in rearwardly converging relationship towards one another and terminating in distal ends, fastening means respectively fixedly fastening the distal ends of said straight portions of said pair of springs to said frame, and fastening means respectively fixedly fastening said pair of springs adjacent the lower ends thereof to said truss.

5. The cycle saddle of claim 3 in which said spring means interposed between said frame and said truss comprises a pair of vertically arranged helical springs having a plurality of helical turns, said pair of spring respectively being provided with substantially straight portions integrally formed with and extending substantially tangentially away from the uppermost of the helical turns of said pair of springs, said substantially straight portions of said pair of springs extending adjacent the underside of said frame in rearwardly converging relationship towards one another and terminating in distal ends, fastening means respectively fixedly fastening the distal ends of said straight portions of said pair of springs to said frame, said pair of springs being respectively provided with additional substantially straight portions integrally formed with and extending substantially tangentially away from the lowermost of the helical turns of said pair of springs, said additional substantially straight portions of said pair of springs extending against the opposite sides of said truss and terminating in distal ends, and fastening means respectively fixedly fastening the distal ends of said additional straight portions to said truss.

6. In a cycle saddle having rear and front ends and including a truss and a frame, means for suspending said frame from said truss comprising a front suspension assembly interposed between said frame and said truss adjacent the front end of said saddle, and spring means interposed betwen said frame and said truss adjacent the rearward end of said saddle, said suspension assembly including a spring having a plurality of coiled turns and having its axis arranged substantially vertical, said spring including a substantially straight torsional portion integrally formed with and leading substantially rearwardly from the upper one of said turns on one side of said spring, said torsional portion extending adjacent the underside of said frame and terminating in a distal end, fastening means fixedly attaching said distal end to said frame, said spring including a substantially straight lower portion integrally formed with and leading substantially radially inwardly towards the axis of said spring from the lower one of said turns and from a place on the opposite side of said spring from said torsional portion, said lower portion terminating in a distal end adjacent the axis of said spring, means pivotally connecting the distal end of said lower portion to said truss adjacent the front end of said saddle to provide pivoting of the lower end of said spring relative to said truss about a transverse axis.

7. The cycle saddle of claim 6 in which said spring means interposed between said frame and said truss comprises a pair of vertically arranged helical springs having a plurality of helical turns, said pair of springs respectively being provided with substantially straight portions integrally formed with and extending substantially tangentially away from the uppermost of the helical turns of said pair of springs, said substantially straight portions of said pair of springs extending adjacent the underside of said frame in rearwardly converging relationship towards one another and terminating in distal ends, fastening means respectively fixedly fastening the distal ends of said straight portions of said pair of springs to said frame, and fastening means respectively fixedly fastening said pair of springs adjacent the lower ends thereof to said truss.

8. The cycle saddle of claim 6 in which said spring means interposed between said frame and said truss comprises a pair of vertically arranged helical springs having a plurality of helical turns, said pair of springs respectively being provided with substantially straight portions integrally formed with and extending substantially tangentially away from the uppermost of the helical turns of said pair of springs, said substantially straight portions of said pair of springs extending adjacent the underside of said frame in rearwardly converging relationship towards one another and terminating in distal ends, fastening means respectively fixedly fastening the distal ends of said straight portions of said pair of springs to said frame, said pair of springs being respectively provided with additional substantially straight portions integrally formed with and extending substantially tangentially away from the lowermost of the helical turns of said pair of springs, said additional substantially straight portions of said pair of springs extending against the opposite sides of said truss and terminating in distal ends, and fastening means respectively fixedly fastening the distal ends of said additional straight portions to said truss.

(References on following page)

References Cited by the Examiner

UNITED STATES PATENTS

| | | | |
|---|---|---|---|
| 679,537 | 7/1901 | Naber | 297—201 X |
| 684,350 | 8/1901 | Bunker | 297—209 X |
| 917,982 | 4/1909 | Wilson | 297—209 |
| 1,440,213 | 12/1922 | Du Broy | 297—209 |
| 2,225,316 | 12/1940 | Mesinger | 297—212 X |
| 2,685,324 | 8/1954 | Kramer | 267—1 |
| 3,104,129 | 9/1963 | Mack | 297—195 |

FOREIGN PATENTS

| | | |
|---|---|---|
| 114,914 | 11/1929 | Austria. |
| 32,330 | 10/1923 | Denmark. |
| 82,602 | 8/1895 | Germany. |
| 635,609 | 4/1934 | Germany. |
| 229,583 | 2/1925 | Great Britain. |
| 229,908 | 3/1925 | Great Britain. |

FRANK B. SHERRY, *Primary Examiner.*

J. T. McCALL, *Assistant Examiner.*